(12) United States Patent
Topham

(10) Patent No.: US 6,826,677 B2
(45) Date of Patent: Nov. 30, 2004

(54) RENAMING REGISTERS TO VALUES PRODUCED BY INSTRUCTIONS ACCORDING TO ASSIGNED PRODUCE SEQUENCE NUMBER

(75) Inventor: Nigel Peter Topham, Wokingham (GB)

(73) Assignee: PTS Corporation, San Jose, CA (US)

( * ) Notice: Subject to any disclaimer, the term of this patent is extended or adjusted under 35 U.S.C. 154(b) by 570 days.

(21) Appl. No.: 09/777,755

(22) Filed: Feb. 6, 2001

(65) Prior Publication Data
US 2001/0016901 A1 Aug. 23, 2001

(30) Foreign Application Priority Data

Feb. 8, 2000 (GB) .............................................. 0002848

(51) Int. Cl.$^7$ ................................................. G06F 9/34
(52) U.S. Cl. ........................ 712/217; 712/216; 712/218; 712/219; 717/140
(58) Field of Search ................................ 712/216, 217, 712/218, 219; 71/140; 717/106

(56) References Cited

U.S. PATENT DOCUMENTS 5,826,055 A * 10/1998 Wang et al. ................. 712/218
5,958,043 A * 9/1999 Motomura ................... 712/216

FOREIGN PATENT DOCUMENTS

EP 698846 2/1996
GB 2276742 10/1994

OTHER PUBLICATIONS

*IBM Technical Disclosure Bulletin*; "Multisequencing a single instruction stream identifying dead registers in the common virtual register file"; vol. 36, N. 4, pp. 441–444; Apr. 1, 1993.

* cited by examiner

*Primary Examiner*—Kenneth S. Kim
(74) *Attorney, Agent, or Firm*—Greer, Burns & Crain, Ltd.

(57) ABSTRACT

A processor, such as a VLIW processor capable of software-pipeline execution, includes an instruction issuing unit 10 for issuing, in a predetermined sequence, instructions to be executed. The sequence of instructions includes preselected value-producing instructions which, when executed, produce respective values. Instruction executing units 14, 16, 18 execute the issued instructions. A register file 20 has a set of registers, for storing values produced by the executed instructions. In operation the processor assigns the values produced by the value-producing instructions respective sequence numbers according to the order of issuance of their respective value-producing instructions. Each produced value is allocated one of the registers, for storing that produced value, in dependence upon the sequence number assigned to that value. The registers may be renamed each time a value-producing instruction is issued.

For such a processor the task of the compiler in register allocation is simplified, and the instruction set can be more compact.

26 Claims, 10 Drawing Sheets

| Cycle | i=0 | i=1 | i=2 | i=3 | i=4 | i=5 |
|---|---|---|---|---|---|---|
| 0 | L1 | | | | | |
| 1 | | | | | | |
| 2 | M | L1 | | | | |
| 3 | L2 | | | | | |
| 4 | | M | L1 | | | |
| 5 | A | L2 | | | | |
| 6 | | | M | L1 | | |
| 7 | | A | L2 | | | |
| 8 | | | | M | L1 | |
| 9 | S | | A | L2 | | |
| 10 | | | | | M | L1 |
| 11 | | S | | A | L2 | |
| 12 | | | | | | M |
| 13 | | | S | | A | L2 |
| 14 | | | | | | |
| 15 | | | | S | | A |
| 16 | | | | | | |
| 17 | | | | | S | |
| 18 | | | | | | |
| 19 | | | | | | S |

| | | Iteration 0 | | | | | Iteration 1 | | | | |
|---|---|---|---|---|---|---|---|---|---|---|---|
| Cycle | Offset | Instruction | v0 | v1 | v2 | v3 | Instruction | v0 | v1 | v2 | v3 |
| 0 | 10 | ld v0, (r1++) | s0▶r10 | | | | | | | | |
| 1 | 10 | | s0▶r10 | | | | | | | | |
| 2 | 9 | mul v1, v0, r3 | s1▶r10 | s2▶r11 | | | | | | | |
| 3 | 9 | ld v2, (r2++) | | s2▶r11 | s4▶r13 | | ld v0, (r1++) | s0▶r9 | | | |
| 4 | 8 | | | s3▶r11 | s5▶r13 | | | s0▶r9 | | | |
| 5 | 8 | add v3, v1, v2 | | s3▶r11 | s5▶r13 | s6▶r14 | mul v1, v0, r3 | s1▶r9 | s2▶r10 | s4▶r12 | |
| 6 | 7 | | | | | s7▶r14 | ld v2, (r2++) | | s2▶r10 | s5▶r12 | |
| 7 | 7 | | | | | s7▶r14 | add v3, v1, v2 | | s3▶r10 | s5▶r12 | s6▶r13 |
| 8 | 6 | | | | | s8▶r14 | | | s3▶r10 | | s7▶r13 |
| 9 | 6 | st v3, (r4++) | | | | s8▶r14 | | | | | s7▶r13 |
| 10 | 5 | | | | | | | | | | s8▶r13 |
| 11 | 5 | | | | | | st v3, (r4++) | | | | s8▶r13 |

Translation:

11  ld v0, (r1++)   →   ld s0, (r1++)
12  mul v1, v0, r3  →   mul s2, s1, r3
13  ld v2, (r2++)   →   ld s4, (r2++)
14  add v3, v1, v2  →   add s6, s3, s5
15  st v3, (r4++)   →   st s8, (r4++)

| Cycle | Offset | Iteration 2 | | | | | Iteration 3 | | | | |
|---|---|---|---|---|---|---|---|---|---|---|---|
| | | Instruction | v0 | v1 | v2 | v3 | Instruction | v0 | v1 | v2 | v3 |
| 0 | 10 | | | | | | | | | | |
| 1 | 10 | | | | | | | | | | |
| 2 | 9 | | | | | | | | | | |
| 3 | 9 | | | | | | | | | | |
| 4 | 8 | ld v0, (r1++) | s0▸r8 | | | | | | | | |
| 5 | 8 | | s0▸r8 | | | | | | | | |
| 6 | 7 | mul v1, v0, r3 | s1▸r8 | s2▸r9 | | | ld v0, (r1++) | s0▸r7 | | | |
| 7 | 7 | ld v2, (r2++) | | s2▸r9 | s4▸r11 | | | s0▸r7 | | | |
| 8 | 6 | | | s3▸r9 | s5▸r11 | | mul v1, v0, r3 | s1▸r7 | s2▸r8 | | |
| 9 | 6 | add v3, v1, v2 | | s3▸r9 | s5▸r11 | | ld v2, (r2++) | | s2▸r8 | | |
| 10 | 5 | | | | | s6▸r12 | | | s3▸r8 | | |
| 11 | 5 | | | | | s7▸r12 | add v3, v1, v2 | | s3▸r8 | s4▸r10 | s6▸r11 |
| 12 | 4 | | | | | s7▸r12 | | | | s5▸r10 | s7▸r11 |
| 13 | 4 | st v3, (r4++) | | | | s8▸r12 | | | | s5▸r10 | s7▸r11 |
| 14 | 3 | | | | | s8▸r12 | | | | | s8▸r11 |
| 15 | 3 | | | | | | st v3, (r4++) | | | | s8▸r11 |

Fig.6(B)

| Cycle | i=0 | i=1 | i=2 | i=3 | i=4 | i=5 |
|---|---|---|---|---|---|---|
| 0 | L1 | | | | | |
| 1 | | | | | | |
| 2 | M | L1 | | | | |
| 3 | L2 | | | | | |
| 4 | | M | L1 | | | |
| 5 | A | L2 | | | | |
| 6 | | | M | L1 | | |
| 7 | | A | L2 | | | |
| 8 | | | | M (1) | L1 (0) | |
| 9 | S | | A (3) | L2 (2) | | |
| 10 | | | | | M (5) | L1 (4) |
| 11 | | S | | A (7) | L2 (6) | |
| 12 | | | | | | M (9) |
| 13 | | | S | | A (11) | L2 (10) |
| 14 | | | | | | |
| 15 | | | | | S | A (15) |
| 16 | | | | | | |
| 17 | | | | | | S |
| 18 | | | | | | |
| 19 | | | | | | S |

Fig.7

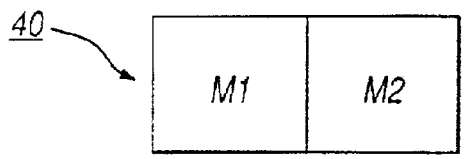
Fig. 11
```
1:    int s = 0;
2:    for (i = 0; i < N; i++)
3:    {
4:        s = s + a[i];
5:        b[i] = s;
6:    }
7:    c = s;
```
Fig. 12
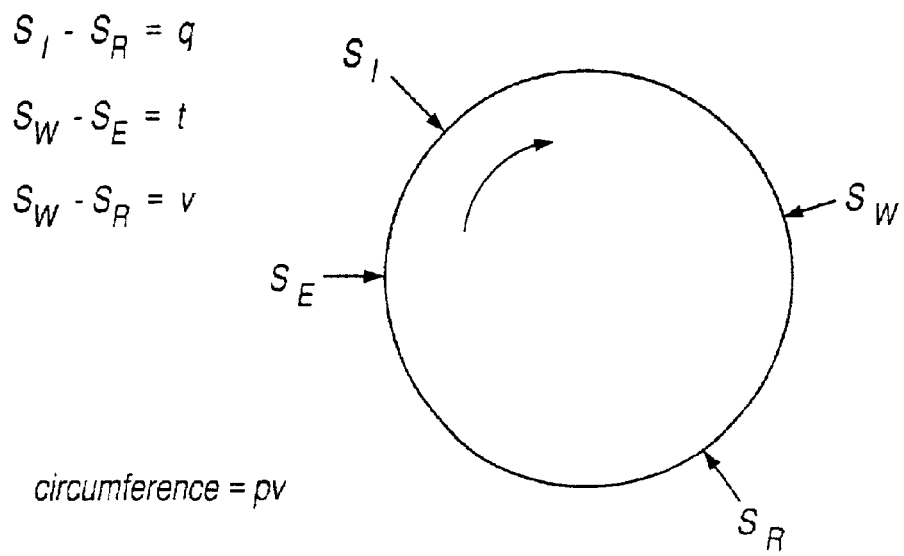
Fig. 13

RENAMING REGISTERS TO VALUES PRODUCED BY INSTRUCTIONS ACCORDING TO ASSIGNED PRODUCE SEQUENCE NUMBER

BACKGROUND OF THE INVENTION

1. Field of the Invention

The present invention relates to communicating instruction results in processors and to compiling methods for processors. In particular, the present invention relates to allocating registers for storing instruction results in processors such as microprocessors.

2. Description of the Prior Art

In high-performance computing, a high rate of instruction execution is usually required of the target machine (e.g. microprocessor). Execution time is often dominated by loop structures within the application program. To permit a high rate of instruction execution a processor may include a plurality of individual execution units, with each individual unit being capable of executing one or more instructions in parallel with the execution of instructions by the other execution units.

Such a plurality of execution units can be used to provide a so-called software pipeline made up of a plurality of individual stages. Each software pipeline stage has no fixed physical correspondence to particular execution units. Rather, when a loop structure in an application program is compiled the machine instructions which make up an individual iteration of the loop are scheduled for execution by the different execution units in accordance with a software pipeline schedule. This schedule is divided up into successive stages and the instructions are scheduled in such a way as to permit a plurality of iterations to be carried out in overlapping manner by the different execution units with a selected loop initiation interval between the initiations of successive iterations. Thus, when a first stage of an iteration i terminates and that iteration enters a second stage, execution of the next iteration i+1 is initiated in a first stage of the iteration i+1. Thus, instructions in the first stage of iteration i+1 are executed in parallel with execution of instructions in the second stage of iteration i.

In such software pipelined loops there are usually loop-variant values, i.e. expressions which must be reevaluated in each different iteration of the loop, that must be communicated between different instructions in the pipeline. To deal with such loop-variant values it is possible to store them in a so-called rotating register file. In this case, each loop-variant value is assigned a logical register number within the rotating register file, and this logical register number does not change from one iteration to the next. Inside the rotating register file each logical register number is mapped to a physical register within the register file and this mapping is rotated each time a new iteration is begun, i.e. each time a pipeline boundary is closed. Accordingly, corresponding instructions in different iterations can all refer to the same logical register number, making the compiled instructions simple, whilst avoiding a value produced by one iteration from being overwritten by a subsequently-executed instruction of a different iteration.

For previously-considered processors the task of the compiler in allocating registers within the rotating register file to values produced in a loop computation is complicated, as will be explained in more detail later in the present specification. It is therefore desirable to provide a mechanism for identifying intermediate values, including loop-variant values, within a loop computation that can simplify the compiler task of allocating registers within the rotating register file. It is also desirable to provide an instruction set for a processor in which the instructions are more compact.

BRIEF SUMMARY OF THE INVENTION

A processor according to a first aspect of the present invention has an instruction issuing unit which issues, in a predetermined sequence, instructions to be executed. The sequence of instructions includes preselected value-producing instructions which, when executed, produce respective values. The processor also has at least one instruction executing unit which executes the issued instructions. A register unit, having a plurality of registers, stores values produced by the executed instruction. A sequence number assigning unit assigns the values produced by the value-producing instructions respective sequence numbers according to the order of issuance of their respective value-producing instructions. A register allocating unit allocates each produced value one of the registers, for storing that produced value, in dependence upon the sequence number assigned to that value.

A compilation method according to a second aspect of the present invention converts a sequence of high-level program instructions into a corresponding sequence of low-level instructions to be executed by a processor. The method comprises determining which low-level instructions of the corresponding sequence are preselected value-producing instructions and which are preselected value-requiring instructions. Each value-producing instruction is an instruction which when executed will produce a value. Each said value-requiring instruction is an instruction which when executed will require the value produced by a previously-issued value-producing instruction. The method assigns the produced values respective sequence numbers according to the order in which their respective value-producing instructions will be issued during execution. Each value-requiring instruction is coded with information for use by the processor during execution to identify the produced value required by that instruction. That information is dependent on the said sequence number assigned to that produced value.

Another aspect of the present invention provides a computer program which, when run on a computer, causes the computer to carry out a compilation method embodying the aforesaid second aspect of the present invention. For example, in one embodiment a computer-readable recording medium has stored thereon a computer program which, when run on a computer, causes the computer to carry out a compilation method for converting a sequence of high-level program instructions into a corresponding sequence of low-level instructions to be executed by a processor. The computer program comprises a determining portion that determines which low-level instructions of the corresponding sequence are preselected value-producing instructions and which are preselected value-requiring instructions. Each value-producing instruction is an instruction which when executed will produce a value. Each value-requiring instruction is an instruction which when executed will require the value produced by a previously-issued value-producing instruction. An assigning portion assigns the produced values respective sequence numbers according to the order in which their respective value-producing instructions will be issued during execution. A coding portion codes each value-requiring instruction with information for use by the processor to identify the said produced value required by that instruction. That information is dependent on the sequence number assigned to that produced value.

BRIEF SUMMARY OF THE INVENTION

FIG. 4 presents a table for use in explaining software-pipelined execution of instructions by a processor;

Figure 1:
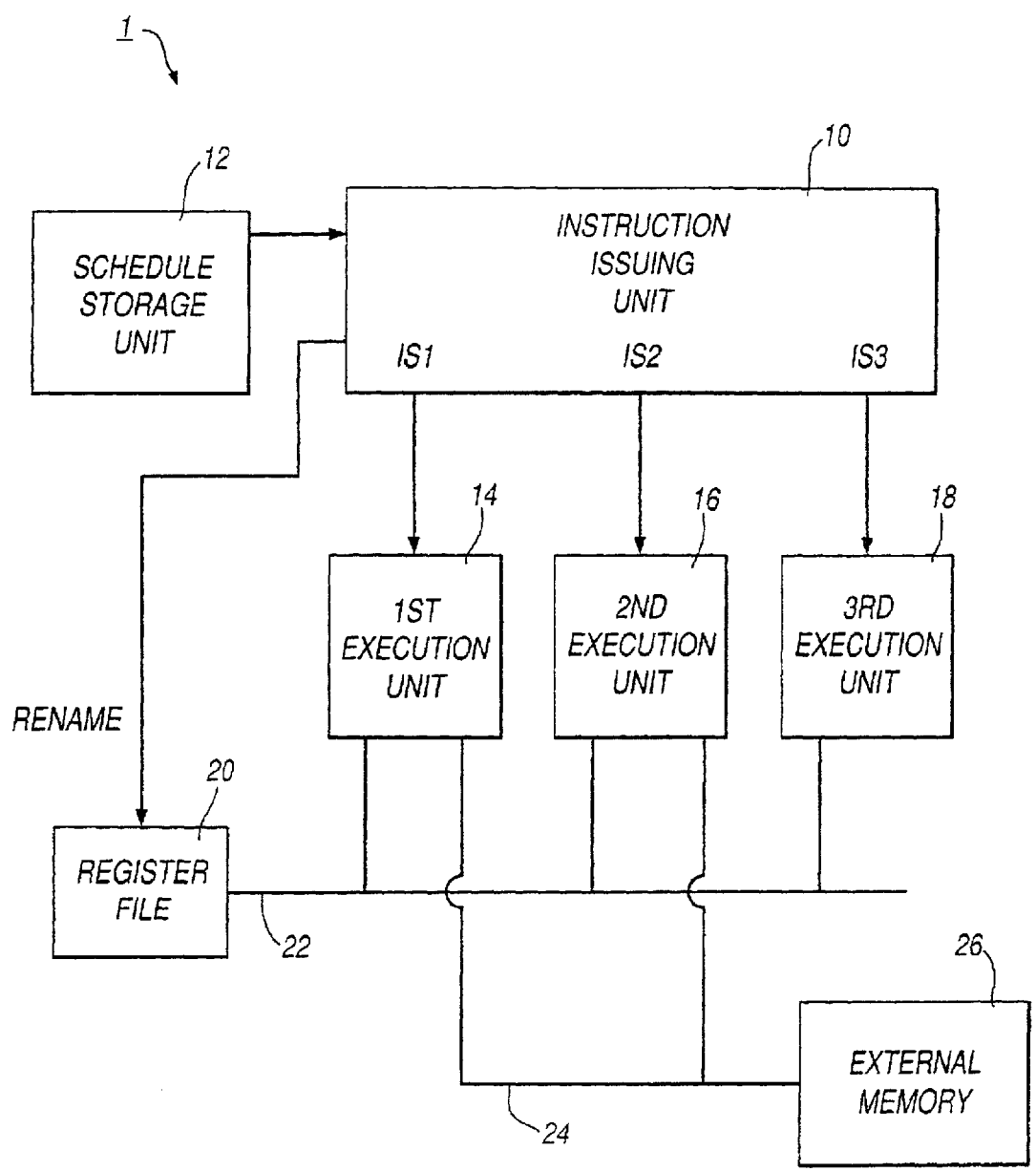
FIG. 1 shows parts of a processor embodying the present invention.
Figure 5:
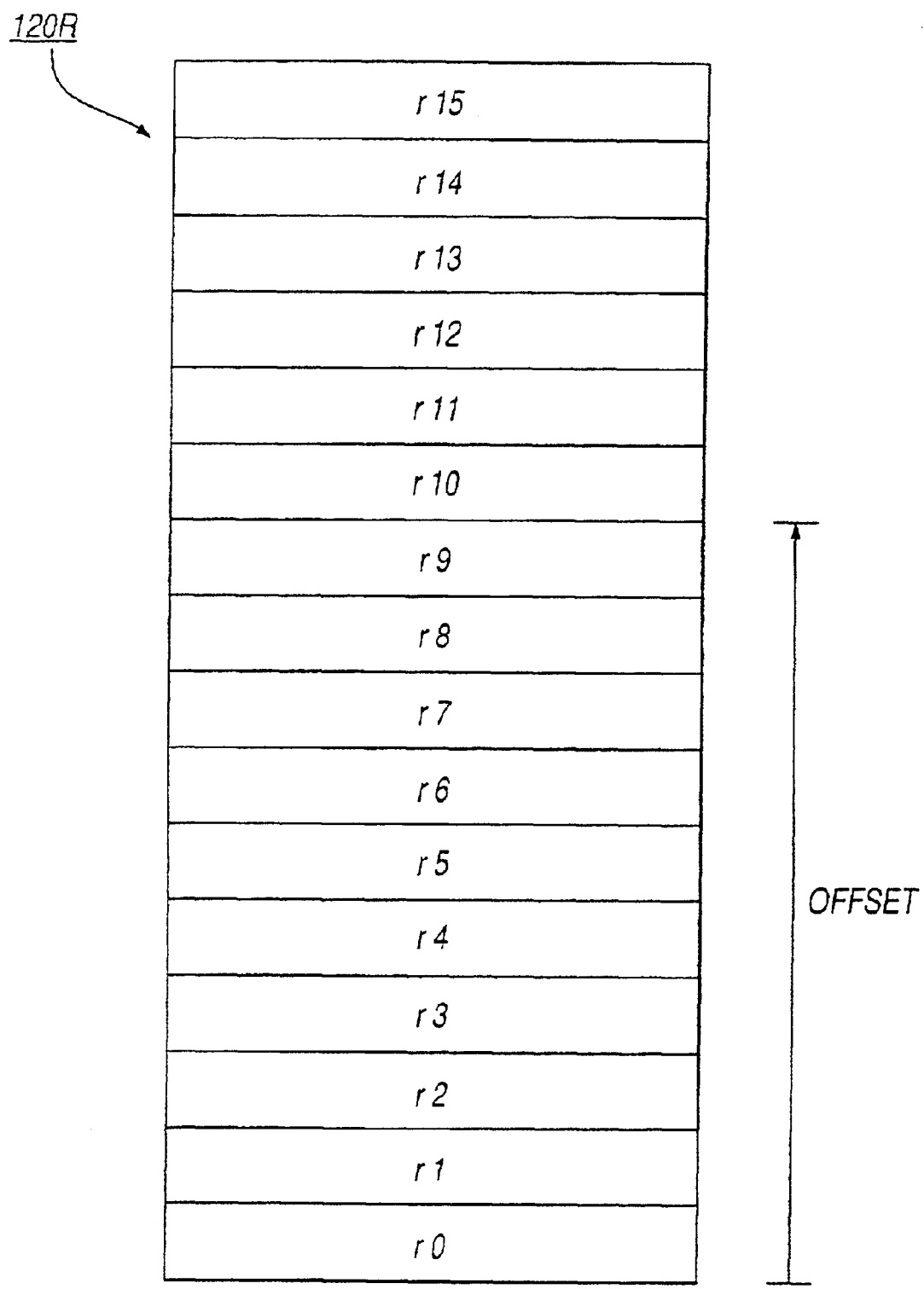
FIG. 5 is a schematic representation of one part of a register file included in a previously-considered processor.
Figure 8:
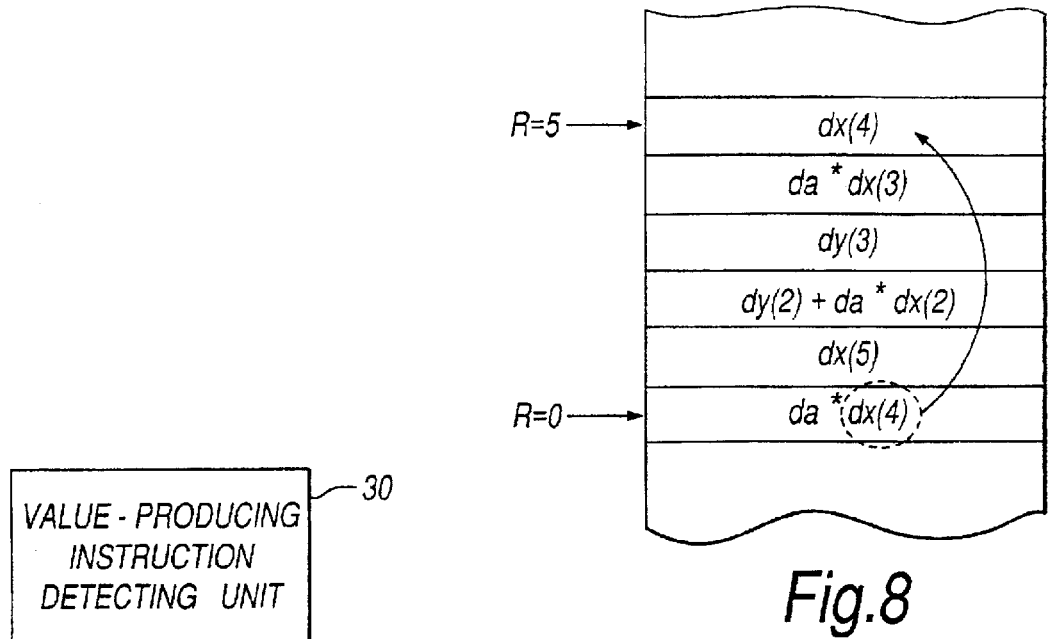
Figure 9:
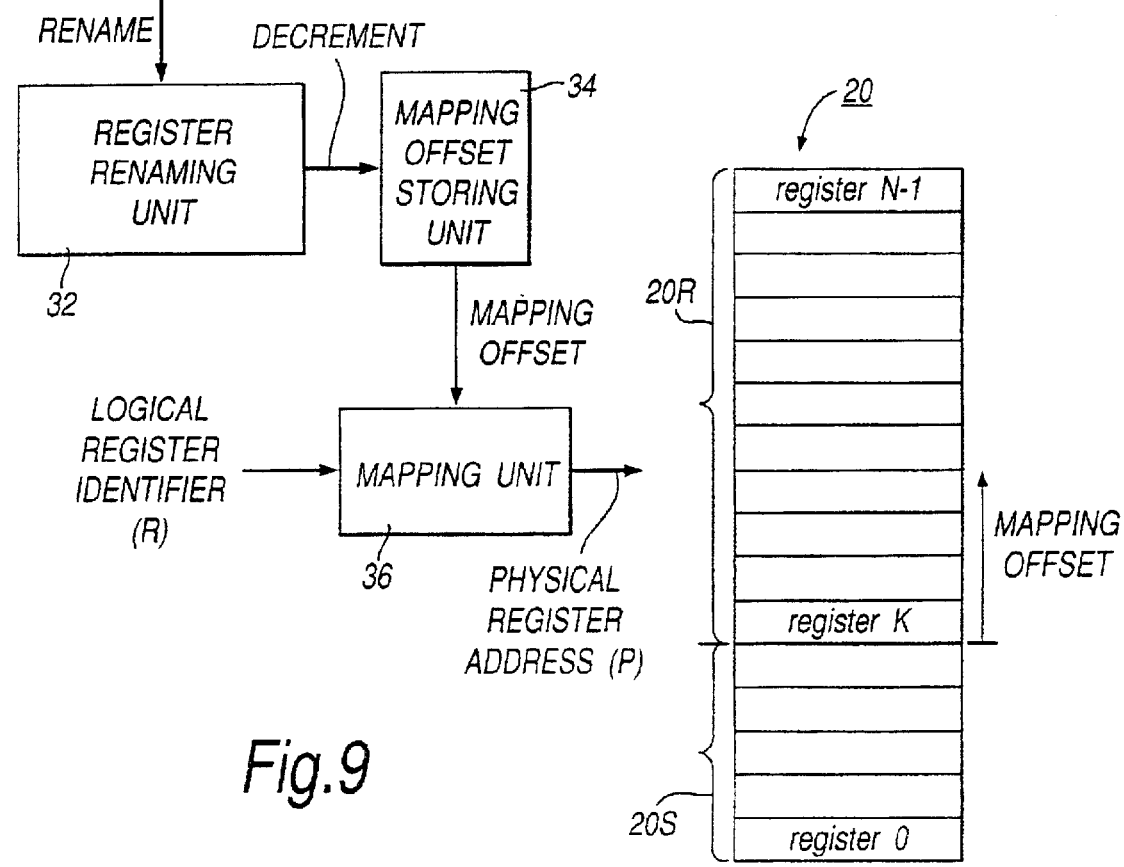
Figure 10:
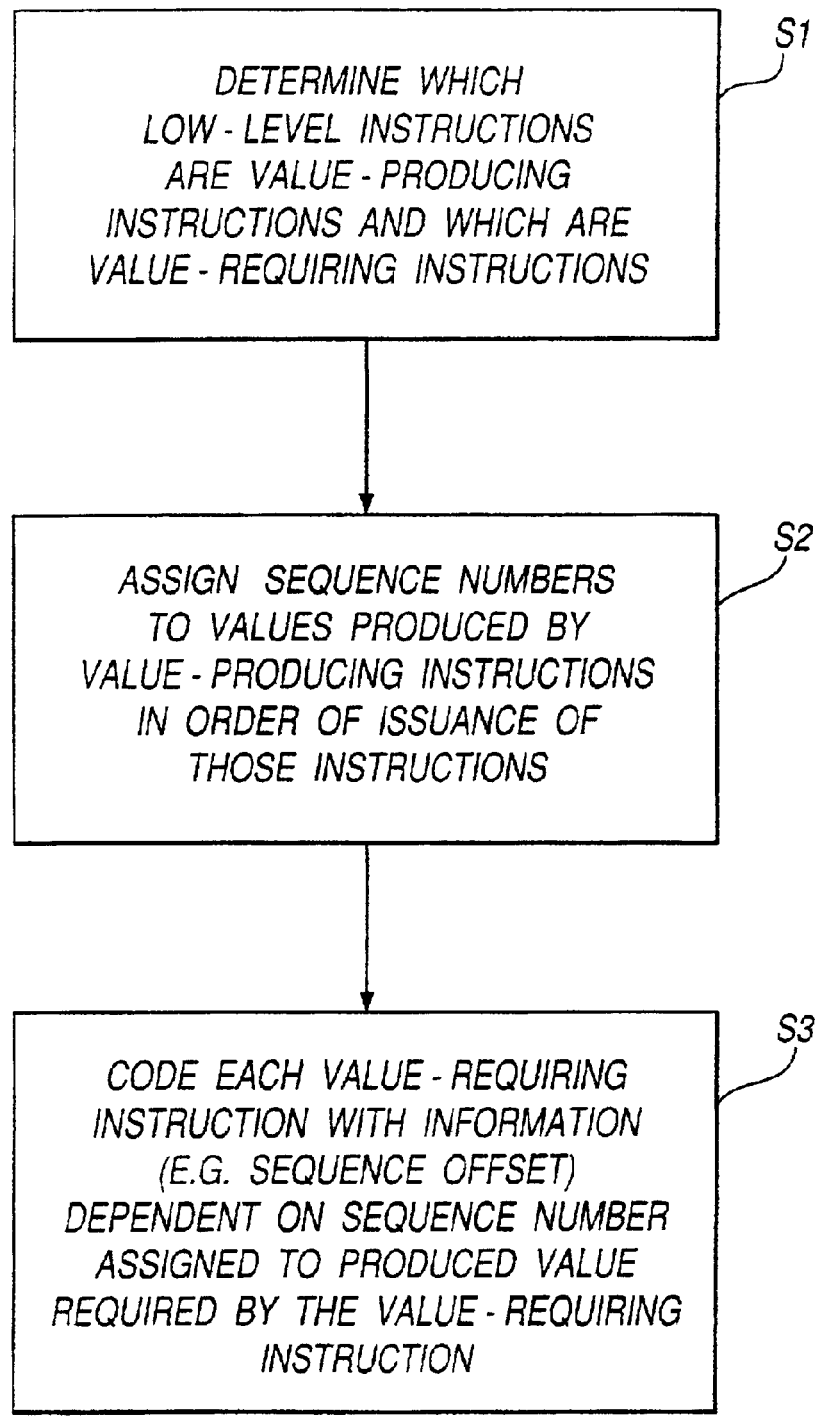

FIGS. 6(A) and 6(B) present a table for use in explaining how registers are designated in a compiling process for the previously-considered processor of FIG. 5;

FIG. 7 presents a table for use in explaining software-pipelined execution of instructions by a processor embodying the present invention;

FIG. 8 shows a schematic diagram illustrating how registers are allocated in the FIG. 7 execution;

FIG. 9 shows parts of the FIG. 1 processor in one embodiment of the present invention;

FIG. 10 shows a flowchart for use in explaining a compiling process embodying the present invention;

FIG. 11 shows parts of a mode register in a processor according to another embodiment of the present invention;

FIG. 12 shows an example of high-level instructions involving a loop; and

FIG. 13 is a schematic representation of registers used in executing the FIG. 12 loop.

DETAILED DESCRIPTION OF THE PREFERRED EMBODIMENTS

FIG. 1 shows parts of a processor embodying the present invention. In this example, the processor is a very long instruction word (VLIW) processor with hardware support for software pipelining and cyclic register renaming. The processor 1 includes an instruction issuing unit 10, a schedule storage unit 12, respective first, second and third execution units 14, 16 and 18, and a register file 20. The instruction issuing unit 10 has three issues slots IS1, IS2 and IS3 connected respectively to the first, second and third execution units 14, 16 and 18. A first bus 22 connects all three execution units 14, 16 and 18 to the register file 20. A second bus 24 connects the first and second units 14 and 16 (but not the third execution unit 18 in this embodiment) to a memory 26 which, in this example, is an external random access memory (RAM) device. The memory 26 could alternatively be a RAM internal to the processor 1.

Incidentally, although FIG. 1 shows shared buses 22 and 24 connecting the execution units to the register file 20 and memory 26, it will be appreciated that alternatively each execution unit could have its own independent connection to the register file and memory.

The processor 1 performs a series of processing cycles. In each processing cycle the instruction issuing unit 10 can issue one instruction at each of the issue slots IS1 to IS3. The instructions are issued according to a software pipeline schedule (described below) stored in the schedule storage unit 12.

The instructions issued by the instructing issuing unit 10 at the different issue slots are executed by the corresponding execution units 14, 16 and 18. In this embodiment each of the execution units can execute more than one instruction at the same time, so that execution of a new instruction can be initiated prior to completion of execution of a previous instruction issued to the execution unit concerned.

To execute instructions, each execution unit 14, 16 and 18 has access to the register file 20 via the first bus 22. Values held in registers contained in the register file 20 can therefore be read and written by the execution units 14, 16 and 18. Also, the first and second execution units 14 and 16 have access via the second bus 24 to the external memory 26 so as to enable values stored in memory locations of the external memory 26 to be read and written as well. The third execution unit 18 does not have access to the external memory 26 and so can only manipulate values contained in the register file 20 in this embodiment.

Next, operation of the FIG. 1 processor will be described in more detail, and a compiling process for compiling instructions for the processor, will be described with reference to a specific example. In this specific example, it is assumed that an application program, written in the high-level language C, contains the following simple loop:

1: for (i=0;i<m; i++)
2: dy(i)=dy(i)+da*dx(i)

Such a loop is very commonly found in application programs (packages) used to perform linear algebra. In this loop, each element dy(i) (i=0, 1, ... m−1) of an array dy is increased by the product of a constant value da and a corresponding element dx(i) of a further array dx.

Figure 2:
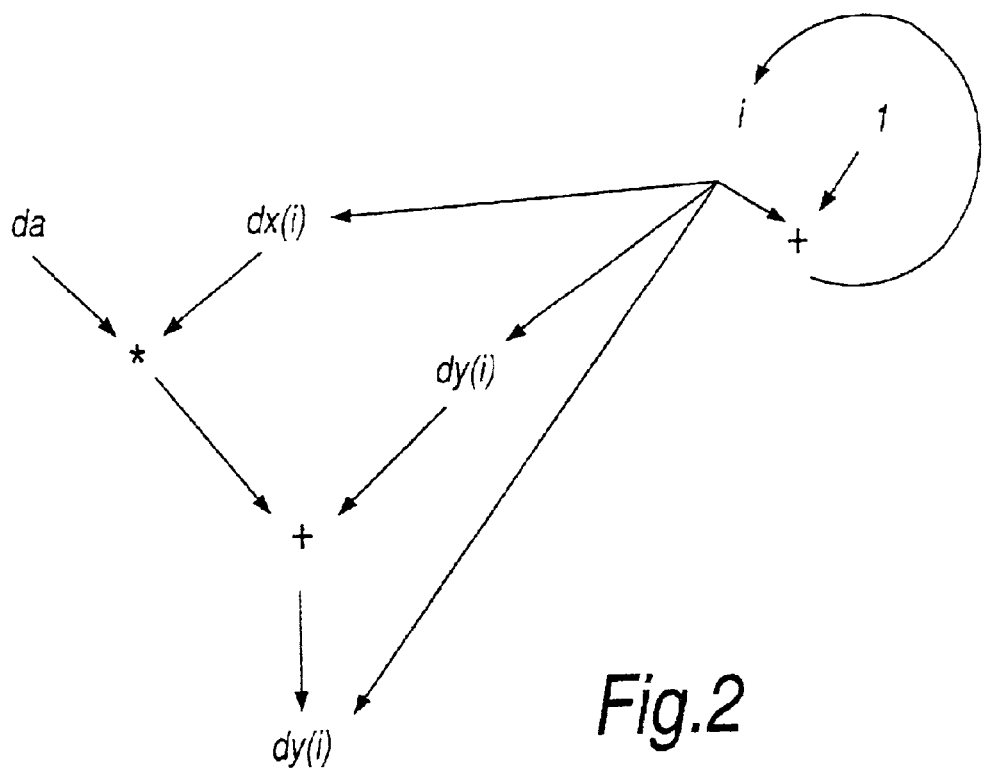
FIG. 2 shows a schematic diagram illustrating a symbolic data-flow graph used in a compiling process.

The process of compiling this loop for the FIG. 1 processor begins with the creation of a symbolic data-flow graph as shown in FIG. 2. The next step is to perform a variety of optimisations to convert the FIG. 2 data-flow graph into a form which is closer to actual machine instructions of the FIG. 1 processor. During this optimisation step the compiler determines what values change within the loop (loop-variant values) and what values remain the same (loop-invariant values). For example, the value of da is not altered at all during the loop.

The arrays dx and dv will be stored in memory locations in the external memory 26 (FIG. 1) and so references to them in the FIG. 2 data-flow graph must be converted into corresponding memory access operations. Thus, each array dx and dv needs at least one pointer for pointing to the storage locations in the external memory 26 where the elements of the array are stored. Each such pointer is held in a register of the register file 20.

Although the constant value da could be dealt with using a similar pointer to its location in the memory, as the value is loop-invariant it is more convenient and fast to keep it directly in its own register of the register file 20 during execution of the loop. Finally, in the optimisation process the compiler takes account of any advantageous features of the available processor instructions such as auto-increment addressing modes.

Figure 3:
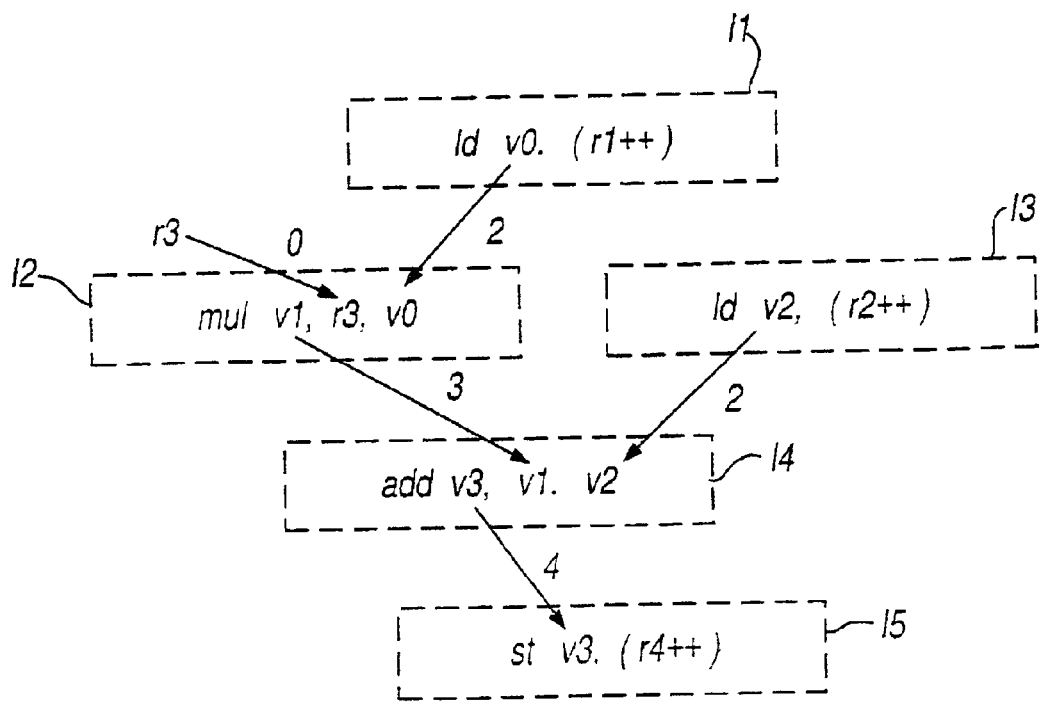
FIG. 3 is a schematic diagram illustrating a tree-structured internal representation of the FIG. 2 graph used in the compiling process.

An example of an internal compiler representation of the FIG. 2 data-flow graph resulting from the optimisation process is shown in FIG. 3. FIG. 3 shows the individual machine instructions and their dependence relationships (an arrow pointing from a first instruction to a second instruction indicates that the second instruction is dependent upon the result of execution of the first instruction). Each arrow in FIG. 3 also has associated with it a number which denotes the number of processor cycles required to complete the execution of the instruction from which the arrow points.

The first instruction I1 is FIG. 3 is a load instruction "ld v0, (r1++)". This instruction is used to load into a register v0 of the register file 20 the value of the array element dx(i). The value is read from the memory location in the external memory 26 pointed to by a further register r1 of the register file. The "++" after "r1" in instruction I1 denotes that after reading the memory location pointed to by the register r1, the register r1 is to be incremented to point to the next successive location in the external memory 26. This is an example of the compiler taking advantage of an auto-increment addressing mode feature of the processor 1.

The second instruction I2 is a multiply instruction "mul v1, r3, v0". This multiply instruction is used to multiply the value of dx(i), loaded in the first instruction I1 into the register v0, by the value of da held in another register r3 of the register file 20. The result of the multiplication is stored in a register v1 of the register file 20.

The third instruction I3 in FIG. 3 is another load instruction "ld v2, (r2++)". This second load instruction is used to load into a register v2 of the register file 20 the value of the array element dy(i) held in the memory location pointed to by a register r2 of the register file 20. This second load instruction is also an auto-increment addressing mode instruction which increments the register r2 automatically after the read operation so that it then points to the next memory location after the location just read.

The fourth instruction I4 in FIG. 3 is an add instruction "add v3, v1, v2". This instruction adds together the respective values held in the registers v1 and v2 (i.e. da*dx(i) and dy(i)) and stores the result in a further register v3 of the register file 20.

The fifth instruction I5 in FIG. 3 is a store instruction "st v3, (r4++)". This instruction is used to store the value held in the register v3 in the external memory 26 at the memory location for dy(i) pointed to by a further register r4 contained in the register file 20.

The memory location (pointed to by the register r2) from which dy(i) is read in the second load instruction I3 must be the same memory location (pointed to by the register r4) into which dy (i) is written in the store instruction I5. It might therefore be considered better to use a single register (e.g. r2) to point to dy(i) in both the second load instruction I3 and the store instruction I5. However, in this example the use of a single register is not possible because (as will be apparent from the later description) the software pipelining results in the second load instruction I3 in the next iteration being executed before the store instruction I5 in the current iteration. If the store instruction I5 were to use the same register r2 as the load instruction I3 to point to dy(i), the register r2 would have been incremented by the load instruction I3 of the next iteration before it could be used by the store instruction I5 of the current iteration. For this reason, the two registers r2 and r4 are used in FIG. 3 to point to dy(i), the two registers having the same value at the start of each iteration and each being incremented once during the course of the iteration but the incrementing of r4 being deferred relative to that of the register r2.

In FIG. 3, it can be seen that the results produced by the instructions I1 to I4 are all loop-variant values which must be distinguished from one another in different iterations. For this reason, these intermediate values are assigned temporary register identifiers (numbers) v0 to v3. These are not the final register assignments but are merely temporary labels for the instruction results (arrows in the data-flow graph) applied by the compiler. The registers r1 to r4, on the other hand, are assigned final (permanent) register numbers because the computation results destined for registers r1 to r4 have latencies and lifetimes that do not span more than one iteration, i.e. by the time r1 needs to be rewritten in a given iteration, the produced value stored in r1 in a previous iteration is no longer needed by any other iteration.

Conceptually, the process of executing one iteration of the loop as shown in FIG. 3 involves evaluating the nodes in the tree starting at the nodes with no predecessor and working towards the root of the tree. In this case, therefore, the order of execution is from I1 to I5 in FIG. 3.

The next stage of the compiling process is to create a software pipeline schedule.

The first phase of software pipelining involves determining a loop initiation interval (II), i.e. the interval between initiation of successive iterations of the loop. This loop initiation interval depends on the available resources in the processor in comparison with the number of instructions to execute, as well as the presence of any cycles in the data-flow graph. For example, the FIG. 1 processor has three instruction issue slots IS1 to IS3 and three execution units 14, 16 and 18, of which only the first and second execution units 14 and 16 are capable of accessing the external memory 26. It may also be the case that the execution units may be "specialised" units in the sense that they are optimised individually for carrying out different tasks. For example, it may be that only certain of the execution units are capable of performing certain types of instruction.

In the present example, it will be assumed that, taking account of the available resources, the loop initiation interval II is determined as two processor cycles. Also, it will be assumed that only the third execution unit 18 is equipped with the resources (e.g. an arithmetic and logic unit ALU) necessary to execute add and multiple instructions.

After this first phase, the next phase is to create a schedule which obeys a so-called modulo scheduling constraint. This constraint relates to the instructions making up one iteration (i.e. the instructions I1 to I5 in FIG. 3). For each available issue slot, an instruction may be scheduled for issue from the slot concerned at cycle x if and only if there are no instructions scheduled for issue from the same issue slot at cycle y, where y modulo II is equal to x. This modulo constraint, if met, ensures that each issue slot only issues a maximum of one instruction per processor cycle.

Table 1 below presents a modulo scheduling table corresponding to the FIG. 3 tree structure. Table 1 shows how the five instructions I1 to I5 making up one iteration of the loop are scheduled. In particular, columns 3 to 5 of the table show the cycle in the schedule when each instruction is issued, the software pipeline stage in which it occurs, and the issue slot by which the instruction is issued (i.e. the execution unit which executes the instruction). In Table 1, the final four columns indicate logical register numbers and shading is used to illustrate value lifetimes, as will be explained later in detail with reference to FIGS. 5, 6(A) and 6(B).

TABLE 1

| stage | cycle | issue slot 1 | issue slot 2 | issue slot 3 | v0 | v1 | v2 | v3 |
|---|---|---|---|---|---|---|---|---|
| 1 | 0 | ld v0, (r1++) | | | s0 | | | |
|   | 1 | | | | s0 | | | |
| 2 | 2 | | | mul v1, v0, r3 | s1 | s2 | s4 | |
|   | 3 | ld v2, (r2++) | | | | s2 | s5 | |
| 3 | 4 | | | | | s3 | s5 | s6 |
|   | 5 | | | add v3, v1, v2 | | s3 | | s7 |
| 4 | 6 | | | | | | | s7 |
|   | 7 | | | | | | | s8 |
| 5 | 8 | | | | | | | s8 |
|   | 9 | | st v3, (r4++) | | | | | s8 |

As shown in Table 1, because of the modulo scheduling constraint no two instructions can be scheduled a multiple of two cycles apart in the same issue slot. Thus, once the first load instruction I1 has been scheduled for issue from issue slot 1 in cycle 0, the next instruction, i.e. the multiply instruction I2 which is to be issued in cycle 2, must be scheduled in a different issue slot from issue slot 1, in this case issue slot 3. Issue slot 3 is chosen because only the third execution unit 18 is capable of executing multiply instructions in this example. Similarly, once the second load instruction I3 has been scheduled for issue in cycle 3 from issue slot 1, the next instruction, i.e. the add instruction 14 which is scheduled for issue in cycle 5, must be issued from a different slot from slot 1, in this case again the slot 3. The fifth instruction, which is the store instruction I5, is required to be issued at cycle 9. Because of the modulo constraint, this cannot be issued in either issue slot 1 or issue slot 3, and must accordingly be assigned to issue slot 2.

It should be understood that the schedule in Table 1 relates to one iteration only. Every II cycles another iteration is initiated according to the same schedule. Thus, when the current iteration is at stage 1, the immediately-preceding iteration will be at stage 2, the iteration before that will be at stage 3, the iteration before that at stage 4 and the iteration before that at stage 5. The instructions are scheduled for issue by the same issue slots in all iterations, that each issue slot issues the same instruction every II cycles.

FIG. 4 shows how first to sixth different iterations (i=0 to i=5) overlap with one another. In FIG. 4, the notation is as follows:

L1 denotes the first load instruction I1,
M denotes the multiply instruction I2,
L2 denotes the second load instruction I3,
A denotes the add instruction I4, and
S denotes the store instruction I5.

In cycle 0, the first iteration (i=0) commences with the issuance from issue slot 1 of the first load instruction L1. No instructions are initiated in cycle 1. In cycle 2, execution of the second iteration (i=1) is initiated with the issuance from issue slot 1 of the load instruction L1. Simultaneously, the multiply instruction M of the first iteration is also issued from issue slot 3. In cycle 3, only the second load instruction L2 of the first iteration is issued. It will be appreciated that, at the time of issuance of L2 of the first iteration, L1 of the second iteration is still not complete. It follows that the first execution unit 14 in the FIG. 1 processor must be capable of executing these two load instructions in parallel with one another in this embodiment.

In cycle 4 execution of the third iteration (i=2) is initiated with the issuance from slot 1 of the first load instruction L1 of that iteration. At the same time, the multiply instruction M of the second iteration is issued from issue slot 3.

Execution continues in this way, until all operations for all iterations have been completed.

The pipelined nature of the execution of the iteration can be seen from FIG. 4. For example, at cycle 8, the fifth iteration (i=4) is at stage 1 of the Table 1 schedule, whilst the fourth iteration (i=3) is at stage 2, the third iteration (i=2) is at stage 3, the second iteration (i=1) is at stage 4 and the first iteration (i=0) is at stage 5.

As mentioned above, "v0" to "v3" are merely temporary identifiers (labels) assigned to the registers. These temporary register identifiers must be translated into logical register identifiers to be specified by the instructions. This translation task is performed by the compiler, taking into account the way in which registers are allocated by the processor at run-time.

Before describing how this task is carried out for a processor embodying the present invention, first an explanation will be given with reference to FIGS. 5, 6(A) and 6(B) of how the task is carried out for a previously-considered processor not embodying the present invention.

FIG. 5 shows a schematic representation of one part of a register file 120 in the previously-considered processor. The part 120R shown in FIG. 5 is the part used by the processor for holding loop-variant values. The register file 120 may also have another part (not shown in FIG. 5) for holding loop-invariant values.

As shown in FIG. 5, the part 120R comprises a plurality (in this example 16) of registers r0 to r15 arranged at successive addresses in the register file 20.

In the register file 120, the logical register identifier specified in an instruction is mapped to a physical register address using a mapping offset OFFSET. For example, as shown in FIG. 5, the mapping offset OFFSET is 10, which means that a logical register identifier s0 is mapped to physical register r10. Logical register identifier s1 is mapped to physical register r11, and so on. The mapping "wraps around" the part 120R so that, for example, logical register identifier s6 maps to physical register r0 when OFFSET equals 10.

In the previously-considered processor having the FIG. 5 register file, when software pipeline execution is used, the mapping offset value OFFSET is changed each time execution of a new iteration is commenced, i.e. every II processor cycles. Changing the mapping offset value has the effect of changing the mapping between the logical register identifiers specified in the instructions and the actual physical registers in the part 20R of the register file 20. This is equivalent to renaming the registers.

The instructions which are executed in software pipelined manner (i.e. the five instructions shown in Table 1 in this example) need to keep the same logical register identifiers irrespective of the particular iteration being performed. However, the renaming of the registers must then be such as to provide each loop-variant value produced in any given iteration with its own register, accessible as necessary by any other instructions requiring that value, for as long as the value is needed (i.e. for the lifetime of the value, shown by shading in the relevant one of the four final columns in Table 1).

For example, as shown in Table 1, the register for storing the value produced by the first load instruction issued in cycle 0 is assigned the temporary register identifier v0, and the produced value concerned has a minimum lifetime of three processor cycles because it is needed in cycle 2 as one of the input operands of the multiply instruction. Similarly, the value produced by the multiply instruction issued in cycle 2 is assigned the temporary register identifier v1, and this produced value has a minimum lifetime of four processor cycles because it is needed by the add instruction in cycle 5.

Taking into account the value lifetimes, and the renaming of the physical registers every II cycles in the previously-considered processor, it follows that for the previously-considered processor the compiler needs to use nine different logical register identifiers s0 to s8 to identify the registers used for holding loop-variant values in the present example.

Referring now to FIGS. 6(A) and 6(B), the way in which, for the previously-considered processor, the temporary register identifiers v0 to v3 are translated by the compiler into the logical register identifiers s0 to s8 as shown in Table 1 will be explained. In FIGS. 6(A) and 6(B), it is assumed that initially the mapping offset value OFFSET is 10. When a first iteration (i=0) is initiated, the first load instruction needs to be allocated a physical register in which to store the loaded value. As this value is the first value requiring a register, that register is specified using the logical register identifier s0 which is mapped within the register file 120 to the physical register r10.

The first renaming of the registers in the previously-considered processor occurs at the start of processor cycle 2, whereupon OFFSET is decremented by 1 and becomes 9.

Two instructions are issued in cycle 2, the multiply instruction of the first iteration and the first load instruction of the second iteration. The multiply instruction requires the value produced by the first load instruction of the first iteration. Because of the renaming of the registers that took place at the start of cycle 2, the logical register identifier s1 must be used to retrieve that value from physical register r10. The logical register identifier in the first load instruction of the second iteration must be the same (s0) as that in the first load instruction of the first iteration. The multiply instruction in the first iteration must also be provided with a register for storing its result. The first free register, after the registers r9 and r10 currently in use, is the register r11, corresponding to logical register identifier s2.

In cycle 3, the second load instruction of the first iteration is issued. This instruction requires a register in which to store its loaded value. The first free register, after the registers r9 to r11 already in use, is the register r12. However, for reasons that will be explained later, r12 must be reserved by the compiler for the produced value of a subsequent iteration, so the loaded value produced by the second load instruction of the first iteration is allocated the register r13, requiring the logical register identifier s4.

The next renaming of the registers in the previously-considered processor occurs at the start of processor cycle 4, whereupon OFFSET is again decremented by 1 to have the value 8.

In cycle 4, the multiply instruction of the second iteration and the first load instruction of the third iteration are issued.

The logical register identifiers for these instructions are the same as for the previous multiply and first load instructions. The physical register r10 can be reused for storing the result of the multiply instruction of the second iteration, as the lifetime of the loop-variant value stored in that register in the previous iteration expired in cycle 2.

In cycle 5, the issued instructions are the add instruction of the first iteration and the second load instruction of the second iteration. The input operands for the add instruction are contained in the registers r11 and r13, requiring the add instruction to specify as logical register identifiers s3 and s5. The register r14, which is the first free register after the in-use register r13, is allocated for the storage of the result of the add instruction. This register is specified by the logical register identifier s6.

The reason why the register r12 had to be skipped in the first iteration can now be seen. The logical register identifier s4 used to allocate a register for storing the result of the second load instruction of the second iteration must be the same as the logical register identifier specified in the corresponding second load instruction of the first iteration. Had s4 been mapped to r12 in the first iteration, s4 would map to r11 in the second iteration. However, this cannot be done because r11, which is the register storing the value produced by the multiply instruction of the first iteration, is still in use at the beginning of cycle 5.

The resulting set of translated instructions corresponding to the instructions I1 to I5 in FIG. 3 is shown at the bottom of FIG. 6(A) itself.

It can be seen from FIGS. 6(A) and 6(B) that the task of the compiler in translating the temporary register identifiers v0 to v3 into logical register identifiers s0 to s8 is a complicated one for the previously-considered processor. The apparently-available register r12 could not, for example, be allocated in the first iteration for storing the produced value of the second load instruction, as this would lead to a conflict in a subsequent cycle.

Table 2 below presents a modulo scheduling table corresponding to Table 1 but in accordance with an embodiment of the present invention.

TABLE 2

| Schedule | | Instruction allocation to schedule | | Value | | |
|---|---|---|---|---|---|---|
| time | | issue | | sequence | | |
| stage | cycle | slot 1 | issue slot 2 | issue slot 3 | s1 | s2 | s3 |
| 1 | 0 | ld (r1++) | | | 0 | 0 | 1 |
| | 1 | | | | 2 | 2 | 3 |
| 2 | 2 | | | mul @ 5, r3 | 4 | 4 | 5 |
| | 3 | ld (r2++) | | | 6 | 6 | 7 |
| 3 | 4 | | | | 8 | 8 | 9 |
| | 5 | | | add @ 5, @ 6 | 10 | 10 | 11 |
| 4 | 6 | | | | 12 | 12 | 13 |
| | 7 | | | | 14 | 14 | 15 |
| 5 | 8 | | | | 16 | 16 | 17 |
| | 9 | | st @ 7, (r4++) | | 18 | 18 | 19 |

In Table 2 the five instructions required for each individual iteration are scheduled in the same cycles and issue slots as in Table 1, but the format of each instruction has been changed and simplified.

Referring back to FIG. 3, in a statically-scheduled processor the order in which the nodes of the FIG. 3 tree are evaluated is fixed by the compiler. Hence, the compiler knows the precise order in which values are produced and consumed during program execution. With this knowledge, it is possible for the compiler to reference previously-computed values by their sequence number relative to the sequence number reached when the current instruction is issued.

Each value produced during the execution of a software pipelined loop schedule is assigned a sequence number by the compiler during compilation. For example, the first value produced has the sequence number 0, and subsequently-produced values are numbered in increasing sequential order. When a loop schedule is software-pipelined there will be k iterations of the loop active concurrently, where k is the number of software pipeline stages after scheduling has taken place. The k iterations are executed in time-overlapping manner, with each successive iteration starting II cycles after the previous iteration.

FIG. 7 presents again the table of FIG. 4 described previously, but with numbers added in parentheses against certain instructions in order to illustrate how sequence numbers are assigned to values during compilation.

In cycle 8 in FIG. 7, the first load instruction L1 of the fifth iteration (i=4) is issued. This load instruction is a value-producing instruction as it produces the value dx(i) needed by the subsequent multiply instruction M of that iteration. It is assumed, as shown in FIG. 7, that the sequence number given by the compiler to the value produced by the cycle-8 first load instruction L1 is 0.

In cycle 8, another value-producing instruction is also issued by the instruction issuing unit 10 simultaneously with the first load instruction L1 of the fifth iteration. That other instruction is the multiply instruction M of the preceding (fourth) iteration. That simultaneously-issued value-producing instruction is issued from issue slot 3, which is after issue slot 1 in a predetermined order of the issue slots (1→2→3), and so the compiler allocates the value produced by the multiply instruction the next sequence number after the sequence number allocated to the value produced by the first load instruction L1, i.e. the sequence number 1.

Thus, although in any given cycle two or more value-producing instructions may be issued from different issue slots, the compiler can systematically assign different sequence numbers to the values produced by those instructions. The assignment is made systematic (predictable) by assigning the sequence numbers in the predetermined order of the issue slots of the simultaneously-issued instructions.

In cycle 9, issue slot 1 issues another value-producing instruction, namely the second load instruction L2 of the fourth iteration. The value produced by this instruction is accordingly assigned sequence number 2. Similarly, the add instruction A of the third iteration is issued from issue slot 3 in cycle 9. Again, this instruction is a value-producing instruction and so the value produced by the instruction must be assigned a sequence number. The sequence number assigned to the value produced by the add instruction in cycle 9 is 3 because the issue slot (issue slot 3) for the add instruction concerned follows (in the predetermined order of issue slots) the issue slot (slot 1) from which the other simultaneously-issued value-producing instruction (L2 of the fourth iteration) was issued.

The store instruction for the first iteration, also issued in cycle 9, is not a value-producing instruction. In fact, it is a value-consuming instruction. Accordingly, no sequence number is assigned to any value associated with the store instruction.

In cycle 10, two value-producing instructions are issued simultaneously by the instruction issue unit 10, namely the first load instruction L1 of the new iteration (sixth iteration) and the multiply instruction of the previous (fifth) iteration. L1 is issued from slot 1 so the value produced by it is assigned the next sequence number, 4. The multiply instruction is issued from the slot 3, and its produced value is assigned the sequence number 5.

During execution of the sequence of instructions by the processor at run-time, the processor allocates registers to the produced values in accordance with the order of issuance of the value-producing instructions which will produce those values, so that the produced values having the sequence numbers 0 to 5 in FIG. 7 are allocated to registers as shown in FIG. 8.

Referring back to Table 2, the form of the multiply instruction in Table 2 can now be explained. This multiply instruction has a first operand specified as "@5" and a second operand specified as "r3". The second operand is straightforward, and simply denotes the content of register r3 as in Table 1. This register stores the loop-invariant value da. The reference "@5" for the first operand denotes that the value required for the first operand is the value having the sequence number 5 less than the present sequence number. When the multiply instruction in cycle 10 of FIG. 7 is issued, the assigned sequence number reached is 5. From the reference "@5", therefore, the processor knows at execution time that it should use as the first operand the value whose assigned sequence number is 5 less than the current sequence number, namely the value produced by the first load instruction L1 issued in cycle 8. It also knows that the register allocated for storing the L1 result will be 5 registers in front of the latest-allocated register in the renameable part of the register file 20, i.e. the register having the logical register identifier 5.

Thus, each input value needed by a value-requiring instruction such as the multiply instruction M can be specified precisely by the difference between the sequence number assigned to that input value and the sequence number reached at the point at which the value-requiring instruction is issued. This difference (e.g. @5) may be referred to as a sequence offset.

FIG. 9 shows in more detail parts of the FIG. 1 processor which, in one embodiment of the present invention, perform the functions of sequence number assignment for the produced values and register allocation and identification.

In FIG. 9 the register file 20 has N registers in total, of which the lower-numbered K registers make up a statically-addressed region 20S and the higher-numbered N–K registers make up a dynamically-addressed (renameable) region 20R. This renameable region is generally similar to the part 120R already described with reference to FIG. 5. The registers of the statically-addressed region 20S are used for storing loop-invariant values, whilst the registers of the renameable region 20R are used for storing loop-variant values. The boundary between the two regions may be programmable. In the example of Table 2, the registers r1 to r4 are in the statically-addressed region 20S, and the boundary is programmed so that the renameable region starts at r5 (i.e. K=5).

A value-producing instruction detecting unit 30 is provided which detects when a value-producing instruction is issued. The value-producing instruction detecting unit 30 is conveniently included in the instruction issuing unit 10 of FIG. 1. Upon detecting the issuance of such an instruction, the value-producing instruction detecting unit 30 produces a RENAME signal. The RENAME signal is applied to a register renaming unit 32. The register renaming unit 32 is connected to a mapping offset storing unit 34 which stores a mapping offset value OFFSET. In response to the RENAME signal the register renaming unit 32 decrements by one the mapping offset value OFFSET stored in the mapping offset storing unit 34.

The mapping offset value OFFSET stored in the mapping offset storing unit 34 is applied to a mapping unit 36. The mapping unit 36 also receives a logical register identifier (R) and outputs a physical register address (P). The logical register identifier (number) is an integer in the range from 0 to N−1. The mapping unit 36 implements a bijective mapping from logical register identifiers to physical register addresses. Each physical register address is also an integer in the range 0 to N−1 and identifies directly one of the actual hardware registers.

If an instruction specifies a logical register number R as one of its operands, and R is in the range 0 to K−1 inclusive, then the physical register number is identical to the logical register number of that operand. However, if R is in the range K to N−1 then the logical register number of that operand is given by P such that:

$$P = K + |R - K + \text{OFFSET}|_{N-K}$$

In this notation, $|y|_x$ means y modulo x.

When a value-producing instruction is issued that will produce a value requiring storage in one of the renameable registers, the next free register in the renameable region 20R is allocated automatically to the value to be produced. That register is simply the register having the logical register number 0, i.e. the physical register number $K + |\text{OFFSET} - K|_{N-K}$. The execution unit which will execute the instruction is informed of the physical register number of the allocated register so that when the value is eventually produced it can be stored in the physical register concerned. Then the mapping offset value OFFSET is decremented by 1 in accordance with the RENAME signal issued by the detecting unit 30.

When a value-requiring instruction is issued that will require a value stored in one of the renameable registers, the register storing the required value is specified in the instruction using its sequence offset relative to the latest-allocated register. This sequence offset can be used directly to provide the logical register identifier R. The sequence offset is therefore applied to the mapping unit 30 which then produces the corresponding physical register number P. For example, in FIG. 8 the latest-allocated register when the multiply instruction of iteration i=4 is issued is the register having the logical register identifier R=0. This multiply instruction requires the produced value dx(4) held in the register having the logical register identifier R=5. Thus, the sequence offset "@5" provides the logical register identifier (5) of the required register directly.

Incidentally, it will be appreciated that an issued instruction can be both a value-producing instruction and a value-requiring instruction.

Referring now to FIG. 10, parts of a compilation method for use in converting a sequence of high-level program instructions into a corresponding sequence of low-level instructions to be executed by the FIG. 1 processor will now be explained. In the case in which the processor supports software-pipelined execution the compilation method may include the steps described above with reference to FIGS. 2, 3 and Table 1 for producing a software pipeline schedule.

In a first step S1 in FIG. 10, the compiler determines which low-level instructions of the corresponding sequence are preselected value-producing instructions and which low-level instructions of the corresponding sequence are preselected value-requiring instructions. For example, the instructions I1 to I4 in FIG. 3 are all preselected value-producing instructions. In addition, the instructions I2, I4 and I5 are all preselected value-requiring instructions which require the produced values of previously-issued value-producing instructions.

In step S2, the compiler assigns sequence numbers to the produced values of the value-producing instructions in the order of issuance of those instructions. The assigned sequence numbers must reflect all overlapping iterations in the case of a software pipeline loop, as described previously with reference to FIG. 7.

Then in step S3, each value-requiring instruction is coded with information, such as the above-mentioned sequence offset, dependent on the sequence number assigned to the produced value that is required by the value-requiring instruction concerned.

A compilation method embodying the present invention can be implemented by a general-purpose computer operating in accordance with a computer program. This computer program may be carried by any suitable carrier medium such as a storage medium (e.g. floppy disc or CD Rom) or a signal. Such a carrier signal could be a signal downloaded via a communications network such as the Internet. The appended computer program claims are to be interpreted as covering a computer program by itself or in any of the above-mentioned forms.

The task of the compiler in computing the sequence offset for each input value is simple as, for a given value-requiring instruction, the sequence offset is simply the difference between the sequence number assigned to the input value concerned and the assigned sequence number reached when the instruction is issued. This makes the compiler task in terms of register allocation in the rotating (renameable) part of the register file much more simple and quick.

In addition, each instruction in Table 2 is shorter compared to its corresponding instruction in Table 1 in that no destination register needs to be specified. This can make the code more compact and execution faster.

Another embodiment of the present invention can provide a processor having two or more register renaming modes. For example, as shown in FIG. 11 the processor may be provided with a mode register having first and second mode bits M1 and M2 used for registering a currently-selected register renaming mode. The mode register 40 may be provided in the register renaming unit 32 in FIG. 9, for example. The first mode bit M1 is used to control whether register renaming is enabled or disabled. The second mode bit M2 is effective only when the first mode bit M1 indicates that register renaming is enabled. In this case the second mode bit M2 is used to control which of two available register renaming modes is to be used. One of these two available modes is the mode described with reference to Table 2 and FIGS. 7 to 9 in which the registers are renamed each time a value-producing instruction is issued. The other available register renaming mode may be any other suitable register renaming mode. For example, the other available mode may be previously-considered mode described with reference to FIGS. 5, 6(A) and 6(B) in which the registers are renamed each time a software pipeline boundary is crossed, i.e. every II processor cycles, where II is the above-mentioned loop initiation interval.

Of course, if it is not desired to provide the capability to disable register renaming at all the first mode bit M1 can be omitted. Similarly, if it is desired to simply enable or disable register renaming based on issuance of value-producing instructions the second mode bit M2 may be omitted.

The or each mode bit may be changed dynamically at execution time, for example under program control.

Next, an optional enhancement of the basic register renaming technique described with reference to Table 2 and FIGS. 7 to 9 will now be described with reference to FIGS. 12 and 13. This optional enhancement is intended to overcome a possible register location inconsistency which can arise in the special case in which a loop body of a software-pipelined loop is not executed at all, as compared to the normal case in which the loop body is executed one or more times. This special case in which the loop body of a software-pipeline loop is not executed at all can arise, for example, when a loop instruction sets up a loop to iterate whilst a loop control variable is changed incrementally from a start value to an end value, but the end value is itself a variable which, at the time the loop instruction is encountered during execution, is less than the start value. This special case results in register locations that are inconsistent with those which follow when the loop body is executed one or more times, as will now be explained.

Consider a software-pipelined loop schedule with v value-producing instructions and p software pipeline stages. For example, in the schedule of Table 2, v=4 and p=5. If the loop iterates n times then the register file would be rotated v(n+p-1) times during execution of the loop. A compiler uses this information to predict the locations in the register file of values produced inside the loop and then subsequently used outside the loop. Normally it is the values produced by the final iteration of the loop that are subsequently required outside the loop. Each such value produced by the final iteration in fact has a location that is independent of the loop iteration count n and is invariant upon exit from the loop provided that the loop iteration count n is greater than 0. The final iteration of the loop requires that the loop schedule be issued p times. Hence, between the start of the final iteration and the final exit from the loop there will be pv rotations of the loop. If any value is live on entry to the loop and live on exit from the loop, then there must be at least pv rotating registers.

Any value produced in one iteration of the loop that is computed as a function of itself in a previous iteration is called a recurrence. Such recurrences are initialised prior to loop entry and are then used after the loop has completed. One example of a loop is shown in FIG. 12. In this example, a scalar variable s is initialised (line 1) prior to the entry into the loop, has a recurrence within the loop body (line 4) and is also used after the loop has completed (line 7). Its lifetime therefore spans the entire loop.

As described previously, the compiler will arrange that in each iteration the code at line 4 will read the value of s produced in the previous iteration from logical register number $S_R$ and write the new value s produced in the current iteration in logical register number $S_W$. These register numbers are chosen such that after rotating the register file v times the value written to register $S_W$ in the previous iteration is now available in register $S_R$ in the current iteration.

The initial value of s, which is defined at line 1 in FIG. 12, must be written to an appropriate register $S_1$ and $S_1$ must be chosen such that when the first iteration reads from $S_R$ in line 4 the value written to $S_1$ in line 1 has rotated such that it is now accessible in register $S_R$. The precise number of rotations between line 1 and line 4 in the first iteration depends on the software pipeline stage in which line 4 occurs and on the position of the instruction which uses s within the loop schedule. Let the number of rotations required to move the value in $S_1$ to $S_R$ be q.

The last write of s into logical register number $S_W$ occurs in line 4 of the final iteration of the loop. This last-written value is read from logical register number $S_E$ after exit from the loop in line 7. Let the number of rotations required to move the value in $S_W$ to $S_E$ be t.

The relationship between these registers $S_1$, $S_W$, $S_R$ and $S_E$ is represented schematically in FIG. 13. In FIG. 13, the circle represents the rotating region of the register file. The size of the rotating region (i.e. the circumference in FIG. 13) is assumed to be pv registers, which is the number of registers needed when there is at least one live-in value that is also live-out. The individual registers in the rotating region are spaced apart at equal intervals around the circumference.

It is assumed that the read of s (in line 4) occurs in software pipeline stage k, where $0 \leq k \leq p-1$. It is also assumed that the read of s (in line 4) occurs when w rotations have occurred during the schedule, where $0 \leq w \leq v-1$. Hence, q=kv+w and t=v(p-k-1)+v-w. From this it follows that the number of rotations from the initial definition of s in line 1 to the position at which a post-exit value-requiring instruction using s can expect to find it is given by q+t-v, which is simply v(p-1).

Accordingly, given an initial logical register $S_1$ at which s is written before the loop is executed, the compiler knows that after the loop has completed the last-written value of s will be found in logical register number $S_1+v(p-1)$. However, this does not apply in the special case in which the loop body is not executed at all, as could occur if the loop control variable N in line 2 of FIG. 12 is found to be 0 or negative at execution time. In this special case, the value of s needed in line 7 would be simply found in $S_1$ rather than in register $S_1+v(p-1)$ as in all other cases. This inconsistency is inconvenient in that the compiler would need to supplement the compiled code with special instructions to deal with the possibility that N could be zero or negative at execution time. It is desirable to avoid the compiler having to take special measures of this kind.

Accordingly, in the above-mentioned enhancement of the register renaming method, the processor is arranged that, if the loop iteration count is found to be zero at execution time, and hence the loop body is not to be executed at all, then the register file is rotated v(p-1) times before the processor continues past the end of the loop. This has the effect of skipping v(p-1) sequence numbers before issuance of a first instruction after exit from the loop. This can conveniently be achieved by issuing the instructions of the loop schedule p-1 times without actually performing the instructions. The act of issuing each value-producing instruction will rotate the register file, so each complete issue of the loop schedule will rotate the register file v times. In this way, when the loop iteration count is zero, the initial value of s is made available in logical register $S_1+v(p-1)$, as desired.

Issuance of the instructions p-1 times can be achieved by effecting going straight into a shut-down mode of the software-pipelined loop, and setting an additional (global) predicate false to prevent any of the instructions being executed.

The enhancement described above does cause the processor to have to take special action at execution time in a case in which the loop iteration count is zero. However, this is normally an improbable occurrence, so the typical execution-time penalty will be small.

The enhancement is also applicable when other register renaming techniques are used, for example the previously-considered technique described with reference to FIGS. 5, 6(A) and 6(B). In this case, the processor is arranged to rotate the registers by p-1 registers in the event of a zero iteration count.

Thus, another aspect of the present invention can provide a processor which renames the renameable registers each time a software-pipeline boundary is crossed (instead of each time a value-producing instruction is issued) and which skips one or more renameable registers in the event of a zero iteration count. In such a processor the number of skipped registers is independent of the number of value-producing instructions, and dependent on the number of software-pipeline stages. Preferably the number of skipped registers is p−1.

Incidentally, it will be understood that for the sequence offsets to be calculated correctly instructions that are turned off due to predicated execution must still advance the numbering of values. However, this never increases the number of registers needed to store intermediate values within a loop.

The technique described above operates correctly in conjunction with software pipelining provided that recurrence values (any loop-variant value that is computed as a function of itself in any previous iteration) are initialised outside the loop in the correct order.

The information included in each value-requiring instruction need not be a sequence offset. It would be possible to specify the identity of the register holding the required value using its assigned sequence number directly or relative to some reference point other than the sequence number currently reached. Similarly, in a value-producing instruction information dependent on the assigned sequence number could be specified to make the register allocation more flexible. For example, a sequence offset (e.g. "@−2") could be specified, to denote a logical register number other than 0 for storing the produced value. Also, the destination register could be specified explicitly based on the assigned sequence number.

It will be appreciated that the sequence numbers assignable to the produced values may have a limit value, e.g. 255, so that the sequence starts from 0 again after reaching the limit value.

Although the above description relates, by way of example, to a VLIW processor capable of software-pipeline execution, it will be appreciated that the present invention is applicable to processors not having these features. A processor embodying the present invention may be included as a processor "core" in a highly-integrated "system-on-a-chip" (SOC) for use in multimedia applications, network routers, video mobile phones, intelligent automobiles, digital television, voice recognition, 3D games, etc.

What we claim is:

1. A processor comprising:
   an instruction issuing unit which issues, in a predetermined sequence, instructions to be executed, said sequence of instructions including preselected value-producing instructions which, when executed, produce respective values;
   at least one instruction executing unit which executes the issued instructions;
   a register unit, having a plurality of registers, which stores values produced by the executed instructions;
   a sequence number assigning unit which assigns said values produced by said value-producing instructions respective sequence numbers according to the order of issuance of their respective value-producing instructions; and
   a register allocating unit which allocates each said produced value to one of said registers, for storing that produced value, in dependence upon the sequence number assigned to that value.

2. A processor as claimed in claim 1, wherein said register allocating unit is operable to allocate each said produced value its said register independently of information contained in the value-producing instruction which when executed produces that value.

3. A processor as claimed in claim 1, wherein said sequence of instructions also includes at least one preselected value-requiring instruction which, when executed, requires said produced value of a previously-issued one of said value-producing instructions, the processor further comprising an allocated register identifying unit operable, during execution of such a value-requiring instruction, to employ information contained in the value-requiring instruction to identify the resister allocated for storing said produced value of said previously-issued instruction, said information being dependent upon said sequence number assigned to that produced value.

4. A processor as claimed in claim 3, wherein said information is a sequence offset representing a difference between the latest-assigned sequence number at the point, in said predetermined sequence, of issuance of said value-requiring instruction and said sequence number assigned to the produced value of said previously-issued instruction.

5. A processor as claimed in claim 1, wherein said register unit includes:
   a set of physical registers allocatable for storing said produced values;
   a mapping unit which maps logical register identifiers specified by said at least one instruction executing unit to respective corresponding physical registers of said set; and
   a register renaming unit which changes said mapping between said logical register identifiers and said corresponding physical registers dynamically during operation of the processor.

6. A processor as claimed in claim 5, wherein said register allocating unit is operable to allocate said produced value of each said value-producing instruction such that one of said physical registers which, in said mapping applicable at the point of issuance of that value-producing instruction, has a predetermined logical register identifier.

7. A processor as claimed in claim 5, wherein said register renaming unit is operable to change said mapping each time such a value-producing instruction is issued.

8. A processor as claimed in claim 7, wherein said register renaming unit is switchable selectively between a disabled mode, in which said mapping is not changed when such a value-producing instruction is issued, and an enabled mode in which said mapping is changed each time such a value-producing instruction is issued.

9. A processor as claimed in claim 7, wherein said register renaming unit is switchable selectively between a first renaming mode, in which said mapping is changed each time such a value-producing instruction is issued, and a second renaming mode different from said first renaming mode.

10. A processor as claimed in claim 9, wherein in said second renaming mode said mapping is changed each tune a software pipeline boundary is crossed during execution of a software-pipelined loop.

11. A processor as claimed in claim 8, further comprising a mode register having one or more mode bits for specifying which of said modes said register renaming unit has.

12. A processor as claimed in claim 5, wherein:
   the physical registers of said set are arranged one after the next at consecutive addresses in a renameable region of a register file; and
   said mapping unit is operable to map a specified logical register identifier to its corresponding physical register using a mapping offset which represents a variable difference between the specified logical register identifier and said address, in said renameable region, of the corresponding physical register.

13. A processor as claimed in claim 12, wherein said register renaming unit is operable to change said mapping by incrementing or decrementing said mapping offset.

14. A processor as claimed in claim 12, wherein: said specified logical register identifier is a sequence offset representing a difference between the latest-assigned sequence number at the point, in said predetermined sequence, of issuance of said value-requiring instruction and said sequence number assigned to the produced value of said previously-issued instruction.

15. A processor as claimed in claim 1, wherein said instruction issuing unit has a plurality of instruction issue slots, and is operable to issue a plurality of instructions simultaneously at different respective ones of the instruction issue slots; and the processor has a plurality of instruction executing units corresponding respectively to said instruction issue slots, each operable to execute the instructions issued at its said corresponding instruction issue slot.

16. A processor as claimed in claim 15, wherein said sequence number assigning unit is operable, when two or more value-producing instructions are issued simultaneously at different respective instruction issue slots, to assign different respective such sequence numbers to the produced values of those two or more value-producing instructions according to a predetermined issue-slot order assigned to the respective instruction issue slots from which those instructions are issued.

17. A processor as claimed in claim 1, operable to execute the instructions of said sequence in a software-pipelined manner, wherein said preselected value-producing instructions include instructions which when executed will produce loop-variant values.

18. A processor as claimed in claim 1, further comprising a loop handling unit operable, in the event that a software-pipelined loop is found during execution of said instructions to require a zero number of iterations, to cause said sequence number assigning unit to skip one or more said sequence numbers before issuance of a first instruction following the loop.

19. A processor as claimed in claim 18, wherein the number of skipped sequence numbers is dependent upon the number of said value-producing instructions issued per iteration of said loop and a number of software-pipelined stages in said loop.

20. A processor as claimed in claim 18, wherein said loop handling unit is operable in said event to cause the instructions of said loop to be issued a number of times dependent on the number of software-pipeline stages in said loop whilst inhibiting said at least one instruction execution unit from executing those instructions, whereby each said value-producing instruction within said loop is issued said number of times.

21. A compilation method, for converting a sequence of high-level program instructions into a corresponding sequence of low-level instructions to be executed by a processor, the method comprising the steps of:

determining which said low-level instructions of said corresponding sequence are preselected value-producing instructions and which are preselected value-requiring instructions, each said value-producing instruction being an instruction which when executed will produce a value, and each said value-requiring instruction being an instruction which when executed will require said value produced by a previously-issued value-producing instruction;

assigning said produced values respective sequence numbers according to the order in which their respective value-producing instructions will be issued during execution; and coding each said value-requiring instruction with information for use by said processor during execution to identify said produced value required by that instruction, that information being dependent on said sequence number assigned to that produced value.

22. A method as claimed in claim 21, wherein in said coding step said information is a sequence offset representing a difference between the sequence number assigned to the latest said produced value at the point in said corresponding sequence at which said value-requiring instruction is issued and said sequence number assigned to said produced value required by that instruction.

23. A method as claimed in claim 21, wherein in said coding step each said value-producing instruction is coded without any information for use by the processor to identify where to store said produced value.

24. A method as claimed in claim 21, wherein said sequence of high-level program instructions includes a loop structure, the method further comprising the steps of:

analysing said loop structure to convert the high-level program instructions of the loop structure into a schedule of said low-level instructions to be executed iteratively by the processor according to a software pipeline; and when one of said instructions in said schedule is such a value-producing instruction whose said produced value is a loop-variant value, assigning the produced value of that instruction different sequence numbers in different iterations.

25. A computer-readable recording medium having stored thereon a computer program which, when run on a computer, causes the computer to carry out a compilation method for converting a sequence of high-level program instructions into a corresponding sequence of low-level instructions to be executed by a processor, the computer program comprising:

a determining portion that determines which said low-level instructions of said corresponding sequence are preselected value-producing instructions and which are preselected value-requiring instructions, each said value-producing instruction being an instruction which when executed will produce a value and each said value requiring instruction being an instruction which when executed will require the value produced by a previously-issued value-producing instruction;

an assigning portion which assigns the produced values respective sequence numbers according to the order in which their respective value-producing instructions will be issued during execution; and a coding portion which codes each value-requiring instruction with information for use by the processor to identify said produced value required by that instruction, that information being dependent on the sequence number assigned to that produced value.

26. A processor comprising:

instruction issuing means for issuing, in a predetermined sequence, instructions to be executed, said sequence of instructions including preselected value-producing instructions which, when executed, produce respective values;

instruction executing means for executing the issued instructions;

register means, having a plurality of registers, for storing values produced by the executed instructions;

sequence number assigning means for assigning said values produced by said value-producing instructions respective sequence numbers according to the order of issuance of their respective value-producing instructions; and register allocating means for allocating each said produced value to one of the said registers, for storing that produced value, in dependence upon the sequence number assigned to that value.

* * * * *